Figure 5:
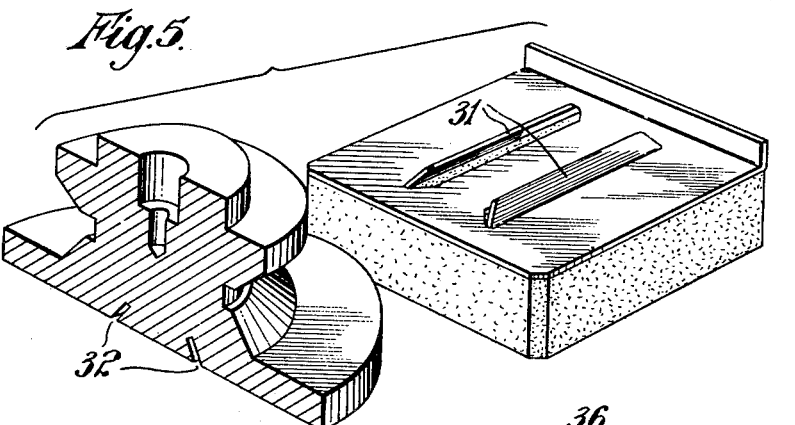

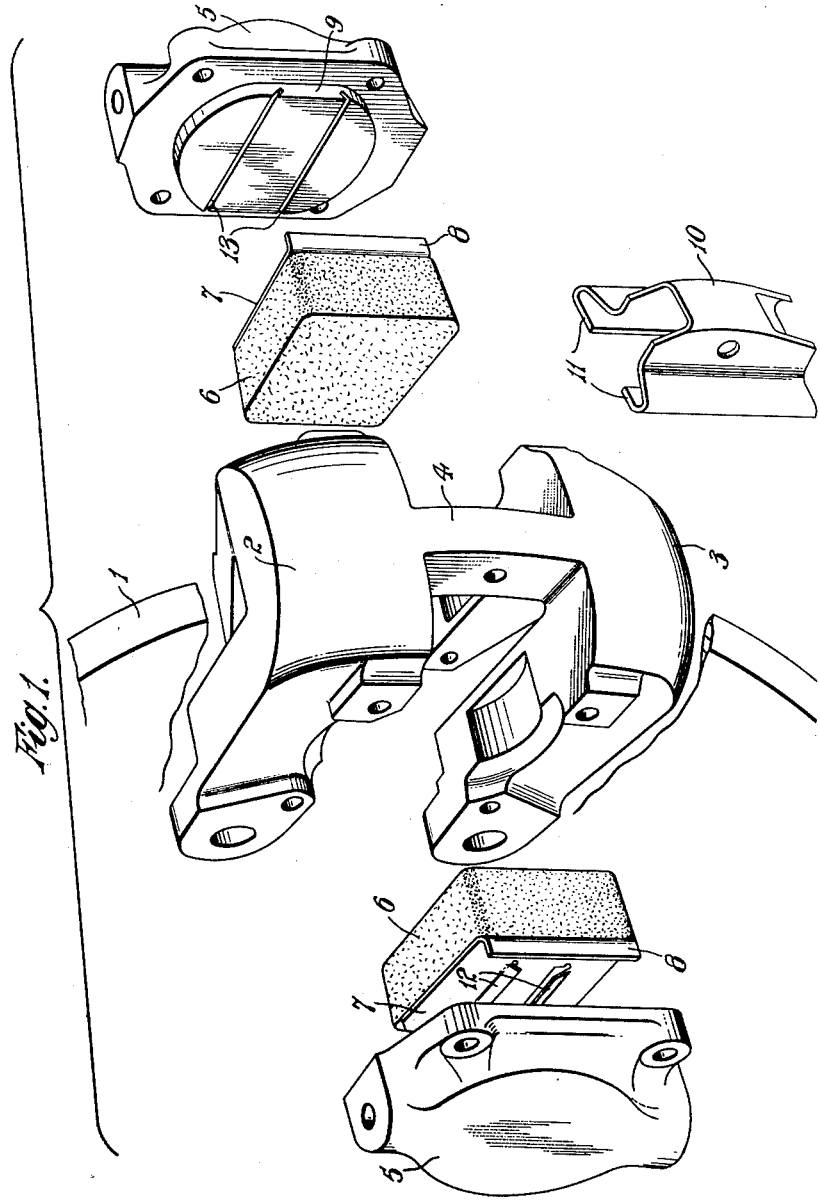

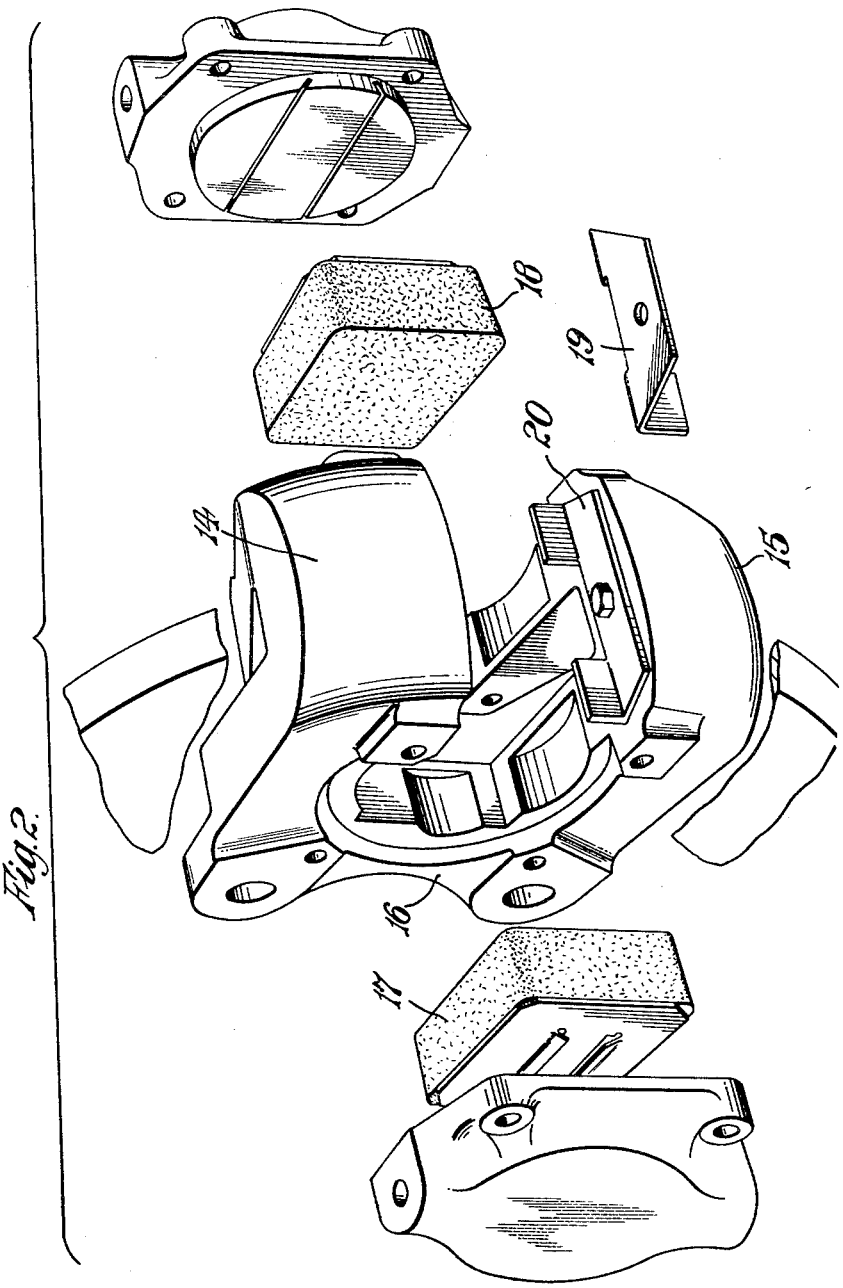

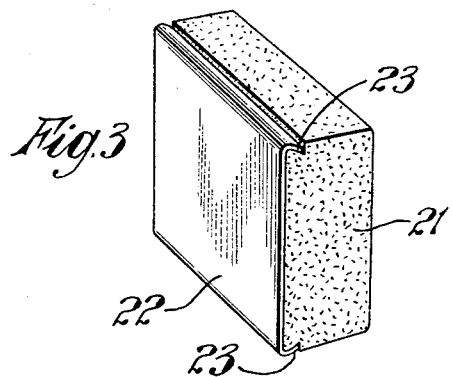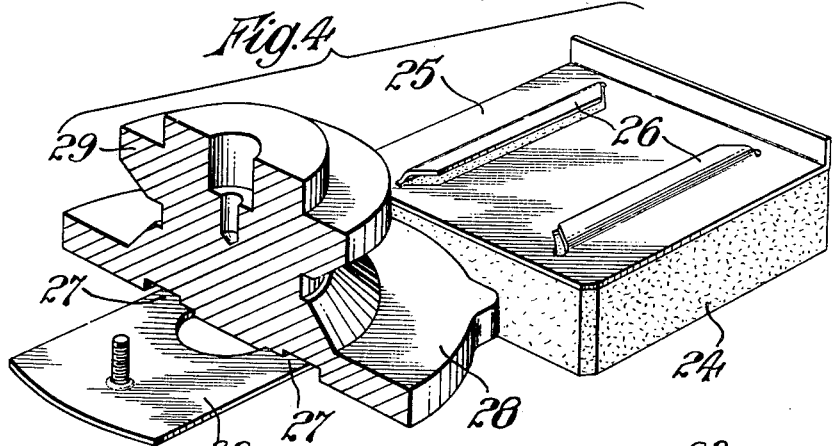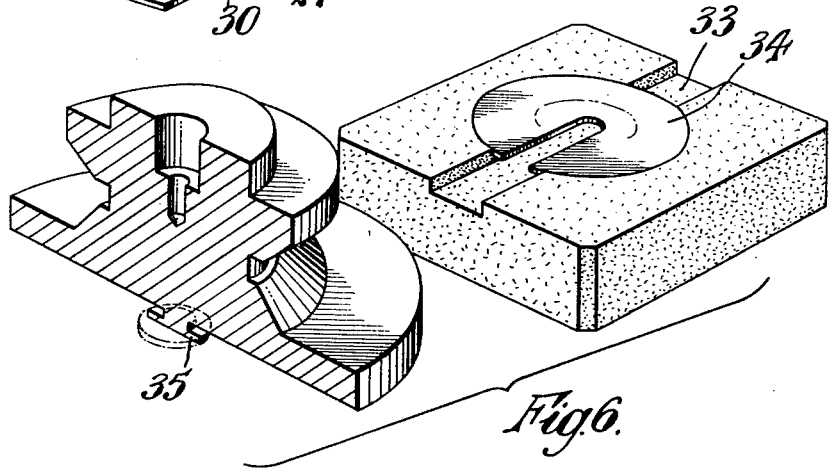

July 3, 1962             H. J. BUTLER             3,042,152
FLUID ACTUATED DISC BRAKES AND HOUSINGS AND
FRICTION ELEMENTS THEREFOR
Filed March 18, 1958             5 Sheets-Sheet 4

INVENTOR
Henry James Butler
by Benj. T. Rauber
his attorney

July 3, 1962 H. J. BUTLER 3,042,152
FLUID ACTUATED DISC BRAKES AND HOUSINGS AND
FRICTION ELEMENTS THEREFOR
Filed March 18, 1958 5 Sheets-Sheet 5
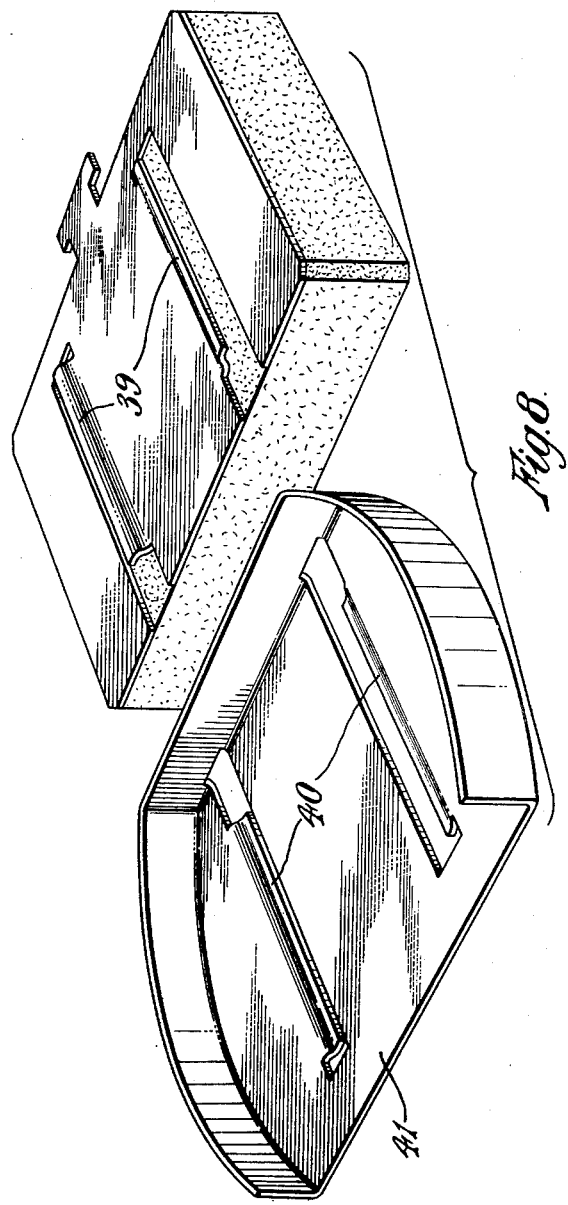
INVENTOR
Henry James Butler
by Benj. T. Rauber
his attorney

United States Patent Office 3,042,152
Patented July 3, 1962

1

3,042,152
FLUID ACTUATED DISC BRAKES AND HOUS-
INGS AND FRICTION ELEMENTS THEREFOR
Henry James Butler, Sutton Coldfield, England, assignor
to Dunlop Rubber Company Limited, London County,
England a British company
Filed Mar. 18, 1958, Ser. No. 722,265
Claims priority, application Great Britain Apr. 1, 1957
11 Claims. (Cl. 188—73)

This invention relates to disc brakes and more particularly relates to improvements in disc brakes of the type in which a hydraulically-operated piston and cylinder mechanism associated with a non-rotatable housing is adapted to force a pad of friction material through guides in the housing and into frictional engagement with a rotatable disc.

It is frequently necessary, with such brakes, to secure the friction pad to the piston so that when an automatic retraction device is fitted to withdraw the piston a predetermined distance after each application of the brakes, the friction pad is also withdrawn the same distance and out of contact with the disc.

It is an object of the present invention to provide a disc brake of the kind described comprising means whereby the friction pad may be detachably secured to the piston so that it can be readily removed therefrom and through an aperture provided in the housing.

It is also an object of the present invention to provide a detachable friction pad assembly suitable for a brake of this kind.

According to the present invention a disc brake comprises a rotatable disc, a non-rotatable housing, a fluid-pressure operated piston and cylinder mechanism associated with said housing, a pad of friction material which is guided for axial movement in the housing into frictional engagement with said disc and connecting means between the friction pad and the piston whereby the pad may be slid clear of the piston, in a direction parallel to the plane of the disc and through an aperture in the housing.

Preferably two piston and cylinder mechanisms are provided each being detachably secured to the housing on opposite sides of the disc and adapted to force a substantially rectangular pad of friction material into frictional engagement with the disc. Preferably also the non-rotatable housing comprises a pair of circumferentially-spaced caliper-members having limbs straddling the outer periphery of the disc and integrally united either adjacent the outer periphery of the disc or adjacent the inner periphery thereof, said limbs on the same side of the disc defining between them apertures having parallel sides within which the friction pads are axially slidable to engage the disc and radially slidable for the purposes of insertion and removal.

According to the present invention also a friction pad assembly for a brake of the type described comprises a pad of friction material having a pair of opposite sides adapted to be guided for axial movement by said brake housing and means associated with said pad for detachably securing said friction pad to a piston or piston extension whereby said friction pad and said piston are axially-movable together and the friction pad is detachable from the piston by movement thereof in a direction parallel to the plane of said disc.

Preferably said detachable securing means comprises a tongue and groove or like joint, the friction pad being provided with the groove and the piston provided with the tongue. A backing plate may be secured to one face of the friction pad and the groove may be formed in said plate or between said plate and the adjacent face of the friction pad.

In order that the invention may be more fully described, reference is made to the accompanying drawings, in which:

FIGURE 1 is an exploded perspective view of a brake embodiment constructed in accordance with one embodiment of the invention, FIGURE 2 is a similar view of a brake constructed in accordance with an alternative embodiment of the invention, FIGURE 3 is a perspective sketch of an alternative type of friction pad assembly, and FIGURES 4-9 are sketches of further alternative types of friction pad assemblies assemblies and the pistons to which they are to be associated.

The disc brake shown in FIGURE 1 is of the kind more fully described in Butler et al. co-pending application Ser. No. 666,354, filed June 18, 1957, now Patent No. 2,943,173, granted April 26, 1960, and briefly comprises a rotatable disc 1, a housing comprising a pair of circumferentially-spaced caliper-ends 2 and 3 each of which is adapted to be secured to a non-rotatable part of a vehicle wheel assembly and which are integrally joined by a bridge-piece 4 extending circumferentially adjacent the outer periphery of the disc and in line therewith. A cylinder 5 is bolted to each side of the housing and a piston is fluid-tightly slidable therein under the influence of hydraulic pressure from a source, which may comprise a conventional master-cylinder.

The limbs of the caliper-ends on the same side of the disc together form a parallel guide for two opposite sides of a rectangular pad 6 of friction material slidable therein. Secured to the face of each pad remote from the disc is a rectangular plate 7 the radially-outer edge being provided with a lip 8 extending axially away from the disc and a flat portion is formed on the radially-outer side of an extension 9 of each piston and this lip 8 and flat portion 9 restrict radially-inward movement of the friction pad. Radially-outward movement of each pad is prevented by the clip 10 which is detachably secured to the bridge-piece 4 by a split pin or a nut and bolt assembly (not illustrated) and which has inwardly-turned flanges 11 abutting the radially-outer edge of each friction pad.

Formed in each backing plate are a pair of tongues 12 parallel to one another and to a radius of the disc and inclined towards each other at an angle of the order of 45° to the plates. These tongues engage complementary grooves 11 provided in each piston extension 9 so that the pistons and friction pads move in unison towards the disc when the cylinders are pressurized to engage the brake and in unison away from the disc when the brake is disengaged and the retracting device, located within the cylinder, moves the piston a predetermined distance away from the disc.

By removing the clip 10 the friction pads with their backing plates may be slid radially clear of the pistons and through the guides of the housing. They are thus readily accessible for renewal purposes. Fresh pads may be slid into position in the same manner.

FIGURE 2 of the drawings shows a brake of a similar type but in this embodiment the caliper-ends 14 and 15 are integrally united on one side of the disc by a portion 16 at the inner periphery of the housing. This portion forms a radially-inner stop for an associated pad 17 of friction material, the radially-inner stop for the other pad 18 being formed integral with the limbs of the caliper-ends on the other side of the disc. Radially-outer pad-stops 19 and 20, comprising angle-members, are detachably secured to the housing within the radially-outer ends of the guides. The friction pads are provided with backing plates having tongues slidably engaging with grooves in the piston extensions and the construction is otherwise identical with the embodiment hereinabove described.

FIGURE 3 shows a friction pad assembly which is suitable for either of the brakes above described. It comprises a rectangular pad of friction material 21 provided, on two of its opposite edges remote from the disc, with an angularly-inclined groove, and a backing plate 22 is secured to the adjacent face of the pad with two opposite lipped edges 23 engaging in said grooves, thereby forming a dove-tailed assembly which is radially slidable in a corresponding groove in a piston extension.

Figure 7:
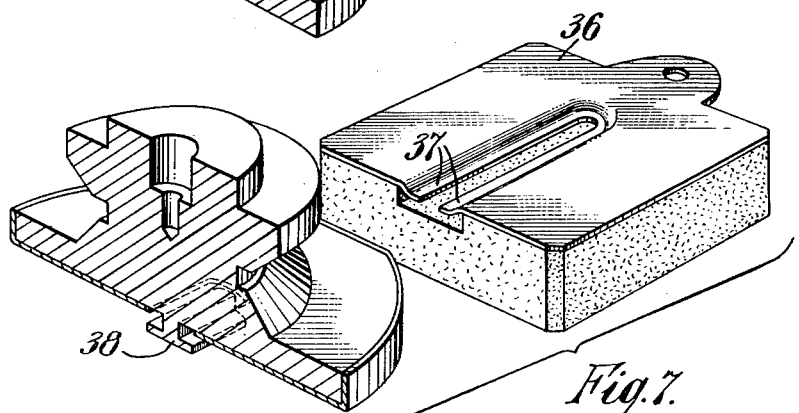

FIGURES 4 to 9 inclusive show alternative friction pad assemblies and the piston and piston extension adapted thereto, which are equally suitable for brakes of the kind described. Thus in FIGURE 4 the friction pad 24 is provided with a backing plate 25 which is in turn provided with a pair of parallel tongues 26 which lie substantially parallel with the surface of the backing plate and are adapted to slidably engage in grooves 27 formed in the extension 28 of the piston 29, a plate 30 being secured to said extension to prevent axial separation of said pad from said extension. In FIGURE 5 the tongues 31 are angularly inclined and engage in complementary grooves 32 in the piston extension. In FIGURE 6 the face of the pad is formed with a groove 33 and a circular backing plate 34 is also partially slotted, the central portion of said plate being domed. The piston extension is provided centrally with a button 35 of inverted T cross-section which engages with the slotted backing plate, the domed portion providing a measure of frictional engagement. In FIGURE 7 the backing plate 36 is rectangular and the slotted portion 37 is recessed and engages with an inverted T-sectioned lug 38 on the piston extension.

Figure 9:
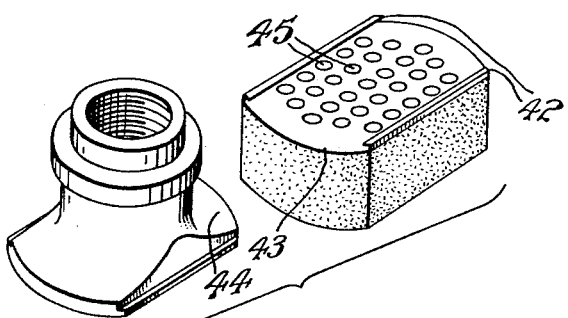

FIGURE 8 shows a friction pad backing plate having two parallel tongues 39 which slidably engage similar tongues 40 on a member 41 adapted to be secured to or form part of a piston extension and in FIGURE 9 the opposite marginal edges 42 of a pad backing plate 43 are inturned to slidably engage the edges of an extension 44 which is adapted to be screwed to a piston. The plate is provided with holes 45 to reduce the heat transfer from the pad to the piston.

All the above friction pad assemblies are characterized in that slidable engaging means are provided so that, when assembled in a brake, the pad and piston move axially in unison but the pad may be withdrawn from the piston in a direction parallel to the surface of the disc.

The friction pad need not necessarily be provided with a backing plate and it may be moulded in such a shape that it is itself adapted to make sliding engagement with the piston or piston extension.

In the brake constructions herein described the pads are slidable radially outwardly of the housing for disengagement with the piston. However the housing may readily be modified so that the pads are slidable radially inwardly for disengagement or in a direction tangential to the disc.

Having now described my invention, what I claim is:

1. A disc brake comprising a rotatable disc, a non-rotatable housing having a portion extending over and slightly spaced from a portion of the periphery of said disc and side walls integral with said portion, one adjacent each of the radially extending surfaces of said disc, said housing having a guide channel on each side of said disc extending from the outer periphery of said housing toward the axis of said disc, each of said channels being of a depth to divide said side walls on each side of said disc and to form a pair of spaced U-shaped members straddling said disc and a connecting web spaced from the outer periphery of the disc, a cylinder mounted on each of said side walls and bridging said channel, a piston in said cylinder slidable towards said disc, a friction element comprising a pad of frictional material having a backing plate with a slot extending inwardly from an edge thereof, held and guided in each of said channels, said piston having a button projecting from its end towards said disc to engage said slot to permit sideways removal of said friction element while retaining the opposed faces of the friction pad and piston in contiguous relationship, said pad of friction material having a groove aligned with the slot in said backing plate and extending from one edge of said friction pad and of greater width than said slot to receive said button, and means removably mounted on said web to stop radial movement of said friction element in said channel.

2. The disc brake of claim 1 in which the backing plate is depressed inwardly into said groove in said friction pad and in which the button of said piston is T-shaped in section and slidable into said groove beneath said depressed portions of said backing plate.

3. The disc brake of claim 1 in which said groove in said friction pad extends in a radial direction and in which said backing plate is a disc having a slot projecting over the edges of said groove and in which said button of said piston is of inverted T-cross section which engages with said slotted backing plate, said backing plate being domed outwardly from said pad of friction material to a spring engagement with said piston.

4. A disc brake which comprises a housing having a pair of limbs spaced to receive a portion of a disc, each of said limbs having a passage transverse to and opening to the space between said limbs to guide and confine a friction element slidably in said passage to and from engagement with a disc between said limbs and extending radially to an opening, a friction element in said passage, a pressure element on each limb spanning the end of said passage remote from said space and comprising a piston slidable alternatively in opposite directions in its passage in abutment with said friction element to move said friction element to and from frictional engagement with the disc, each passage having a pair of surfaces on opposite sides of a radius of the disc to support stresses imposed by said friction element, said friction element comprising a block of friction material confined by said surfaces of said passages and having a radially extending groove in its surface opposite said piston and a metal plate secured to said surface of said friction block and having a slot aligned with the groove in said block and of lesser width to provide margins overhanging the groove in said black, said piston having a projecting portion undercut to form a neck in the slot of said plate and a head extending into said groove in said block and engaging the overhanging margin of said plate to engage said block to said piston for movement toward and from the disc and to permit relative displacement of said block relative to said piston in a direction radially of said disc, and a removable stop on said limb to prevent radially outwardly displacement of said block in said passage.

5. The disc brake of claim 4 in which said plate is flat and is set into said block.

6. The disc brake of claim 4 in which said slot in said plate terminates midway in said block.

7. The disc brake of claim 4 in which the overhanging margins of said plate are depressed into said groove in said block.

8. A friction element for disc brakes which comprises a block of friction material having a bottom face to engage a brake disc, a top face and a pair of side faces and having a groove in its top face, and a rigid plate secured to said top face of said block and having a slot aligned with said groove and of less width to form a pair of margins overhanging said groove.

9. The friction element of claim 8 in which said plate is flat and is set into the top face of said block.

10. The friction element of claim 8 in which said slot terminates midway of said groove.

11. The friction element of claim 8 in which the overhanging margins are depressed inwardly of said groove.

References Cited in the file of this patent

UNITED STATES PATENTS

| | | |
|---|---|---|
| 348,041 | Newhard | Aug. 24, 1886 |
| 2,139,409 | Hunter | Dec. 6, 1938 |
| 2,541,979 | Amundsen | Feb. 20, 1951 |
| 2,934,173 | Butler et al. | Apr. 26, 1960 |
| 2,937,723 | Hodkinson | May 24, 1960 |
| 2,966,964 | Brueder | Jan. 3, 1961 |

FOREIGN PATENTS

| | | |
|---|---|---|
| 1,087,549 | France | Aug. 25, 1954 |
| 1,117,453 | France | Feb. 27, 1956 |
| 1,129,042 | France | Sept. 3, 1956 |
| 742,338 | Great Britain | Dec. 21, 1955 |